(12) United States Patent
Sugiki

(10) Patent No.: US 7,081,920 B2
(45) Date of Patent: Jul. 25, 2006

(54) ILLUMINATION LIGHT COLOR ESTIMATING METHOD OF OBTAINING WHITE BALANCE AND IMAGE SENSING APPARATUS

(75) Inventor: Tadashi Sugiki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 674 days.

(21) Appl. No.: 10/233,669

(22) Filed: Sep. 4, 2002

(65) Prior Publication Data
US 2003/0063197 A1    Apr. 3, 2003

(30) Foreign Application Priority Data
Sep. 14, 2001    (JP)    ............... 2001-280636

(51) Int. Cl.
*H04N 9/73*    (2006.01)
(52) U.S. Cl. .................................. 348/223.1
(58) Field of Classification Search ............. 348/223.1, 348/224.1, 228.1
See application file for complete search history.

(56) References Cited
U.S. PATENT DOCUMENTS

| | | | |
|---|---|---|---|
| 4,685,071 A | 8/1987 | Lee | |
| 4,883,360 A | 11/1989 | Kawada et al. | |
| 4,954,884 A | 9/1990 | Nakayama et al. | |
| 6,839,088 B1 * | 1/2005 | Dicarlo et al. | ............... 348/370 |
| 6,876,384 B1 * | 4/2005 | Hubina et al. | ............ 348/223.1 |
| 2002/0167598 A1 * | 11/2002 | Oeda et al. | ............ 348/223.1 |
| 2004/0090536 A1 * | 5/2004 | Tsai et al. | ............ 348/223.1 |
| 2005/0195289 A1 * | 9/2005 | Jacobs et al. | ............ 348/223.1 |

FOREIGN PATENT DOCUMENTS

| | | |
|---|---|---|
| JP | 1-46393 | 2/1989 |
| JP | 2001-112019 | 4/2001 |
| JP | 2002-335540 | 11/2002 |

* cited by examiner

*Primary Examiner*—Tuan Ho
(74) *Attorney, Agent, or Firm*—Pillsbury Winthrop Shaw Pittman, LLP

(57) ABSTRACT

When average color data indicates blue, the blue component is reduced from the average color data. A line is drawn diagonally from that point downward to the left at 45° on the coordinate system. The intersection between this line and the abscissa is estimated as the color of the light source. When average color data indicates green close to cyan, the cyan component is reduced from the average color data. A broken line is drawn diagonally from that point upward to the left at 45° on the coordinate system, and the intersection between this broken line and the abscissa is obtained. In this case, the value of the abscissa of estimated light source color is set to 0.

8 Claims, 13 Drawing Sheets

ILLUMINATION LIGHT COLOR ESTIMATING METHOD OF OBTAINING WHITE BALANCE AND IMAGE SENSING APPARATUS

CROSS-REFERENCE TO RELATED APPLICATIONS

This application is based upon and claims the benefit of priority from the prior Japanese Patent Application No. 2001-280636, filed Sep. 14, 2001, the entire contents of which are incorporated herein by reference.

BACKGROUND OF THE INVENTION

1. Field of the Invention

The present invention relates to an illumination light color estimating method of obtaining white balance and an image sensing apparatus using the estimating method and, more particularly, to a technique of obtaining a satisfactory image by an electronic still camera or movie/video camera independently of the color temperature of illumination light.

2. Description of the Related Art

Electronic still cameras and movie/video cameras employ an automatic white balance adjusting technique. In the internal circuit of a camera, color difference signals (ER–EY) and (EB–EY) are generated from a signal obtained by photographing an object. To realize automatic white balance adjustment, the color difference signals (ER–EY) and (EB–EY) are integrated over the entire screen. The gains of red and blue signals are controlled such that the integration average values of the color difference signals respectively match predetermined reference levels.

In this automatic white balance adjusting method, however, when a chrominance signal with a high degree of saturation is present, the average integration values change (are affected) by the chrominance signal with a high degree of saturation. For this reason, no white balance is set.

To solve this problem, in Jpn. Pat. Appln. KOKAI Publication No. 1-46393, in obtaining integration average values, slice level A is set for each color difference signal to detect a strong color difference signal. When a strong color difference signal, higher than the set slice level A is present in the color difference signals, the strong color difference signal is replaced with a weak color difference signal, and the replaced color difference signal is integrated.

As a result, the strong color difference signal is replaced with the weak color difference signal. Hence, white balance can be prevented from greatly changing due to the influence of a chrominance signal having a high degree of saturation. However, when a strong color difference signal is replaced with a weak color difference signal, the reproduced color of the image becomes light in accordance with the slice level. Also, when an object having a similar color is photographed, the reproduced color of the image becomes light.

As is well known, when an object is photographed under domestic fluorescent lighting, a greenish image is obtained. This is because light from a fluorescent lamp contains a larger amount of green than an incandescent light source. To set white balance under fluorescent lighting conditions, the slice level for a color difference signal must be shifted to the green side. However, when the slice level is shifted to the green side, green becomes light on a screen in an outdoor photography mode due to the large green component of trees, etc. In addition, white changes to light magenta.

In the above-described illumination light color estimating method for automatic white balance, when a strong color difference signal is replaced to the slice level difference signal, the color on the screen becomes light in a predetermined level. And even when a similar color is photographed, the color on the screen becomes light. In addition, when white balance is set under illumination light of a fluorescent lamp at the time of photographing, white balance shifts at the time of outdoor photographing under a condition of a large green component is present.

BRIEF SUMMARY OF THE INVENTION

It is therefore an aspect of the present invention to provide an illumination light color estimating method for automatic white balance, which prevents the color of an image from inadvertently becoming light, and also prevents an outdoor scene photographing mode from being mistaken for a fluorescent lamp illumination mode, and an image sensing apparatus.

To solve the above problem, according to an embodiment of the present invention, comprising: acquiring average values of the three primary color signals from an image sensing element, the three primary colors having signal levels equalized with respect to illumination light having a predetermined color temperature in a predetermined image sensing area of the image sensing element; setting the signal with the higher level, of red and blue signals contained in the average values, as a signal of interest; reducing the red or blue signal in the signal of interest together with a green signal at the same ratio when the green signal is larger than a value obtained by dividing a resultant value by the green signal, and reducing the red or blue signal in the signal of interest when the green signal is smaller than the resultant value, the resultant value being obtained by multiplying the red signal by the blue signal; and obtaining a white point at which a geometric average of the red and blue signals obtained by the reduction processing has the same level as that of the green signal and estimating a color corresponding to the white point as the illumination light color.

In the above estimating method, illumination light color estimation capable of realizing white balance by reducing a strong color component of three primary color signals from colors in an image while maintaining a color appearance to serve as a light source color becomes possible.

Additional objects and advantages of the present invention will be set forth in the description which follows, and in part will be obvious from the description, or may be learned by practice of the present invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention.

DETAILED DESCRIPTION OF THE INVENTION

The embodiments of the present invention will be described below in detail with reference to the accompanying drawing.

Figure 1:
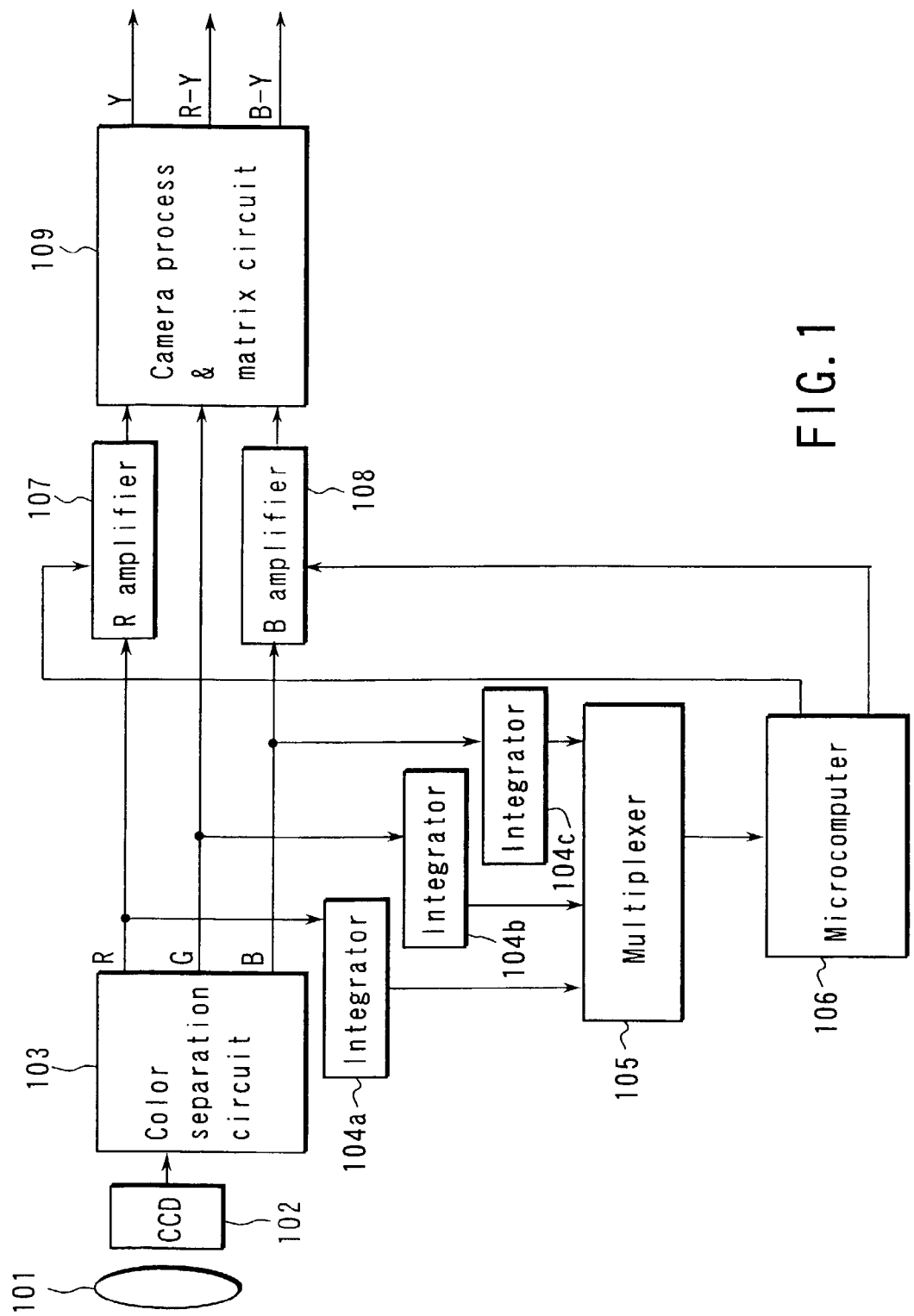
FIG. 1 is a block diagram of an image sensing apparatus for explaining the first embodiment of the present invention.

FIG. 1 is a block diagram for explaining the first embodiment of the present invention. The optical image of an object received through a lens 101 is formed on a solid-state image sensing element 102. The solid-state image sensing element 102 photoelectrically converts a light amount incident on each pixel and outputs a video signal. The video signal is input to a color separation circuit 103. The color separation circuit 103 separates three primary color signals (red (R), green (G), and blue (B) signals) from the video signal and outputs them. Integration circuits 104a, 104b, and 104c integrate the red (R), green (G), and blue (B) signals and outputs the average values (average color data) of the signals, respectively.

A multiplexer 105 sequentially selects the primary color signals and transfers the average value of the primary color signals to a microcomputer 106. The microcomputer 106 estimates the color of the light source using an algorithm (to be described next) and outputs signals to control the gains of an R amplifier 107 and B amplifier 108. Thus, R, G, and B signals with satisfactory white balance are input to processing circuit 109 of the camera.

Figure 2:
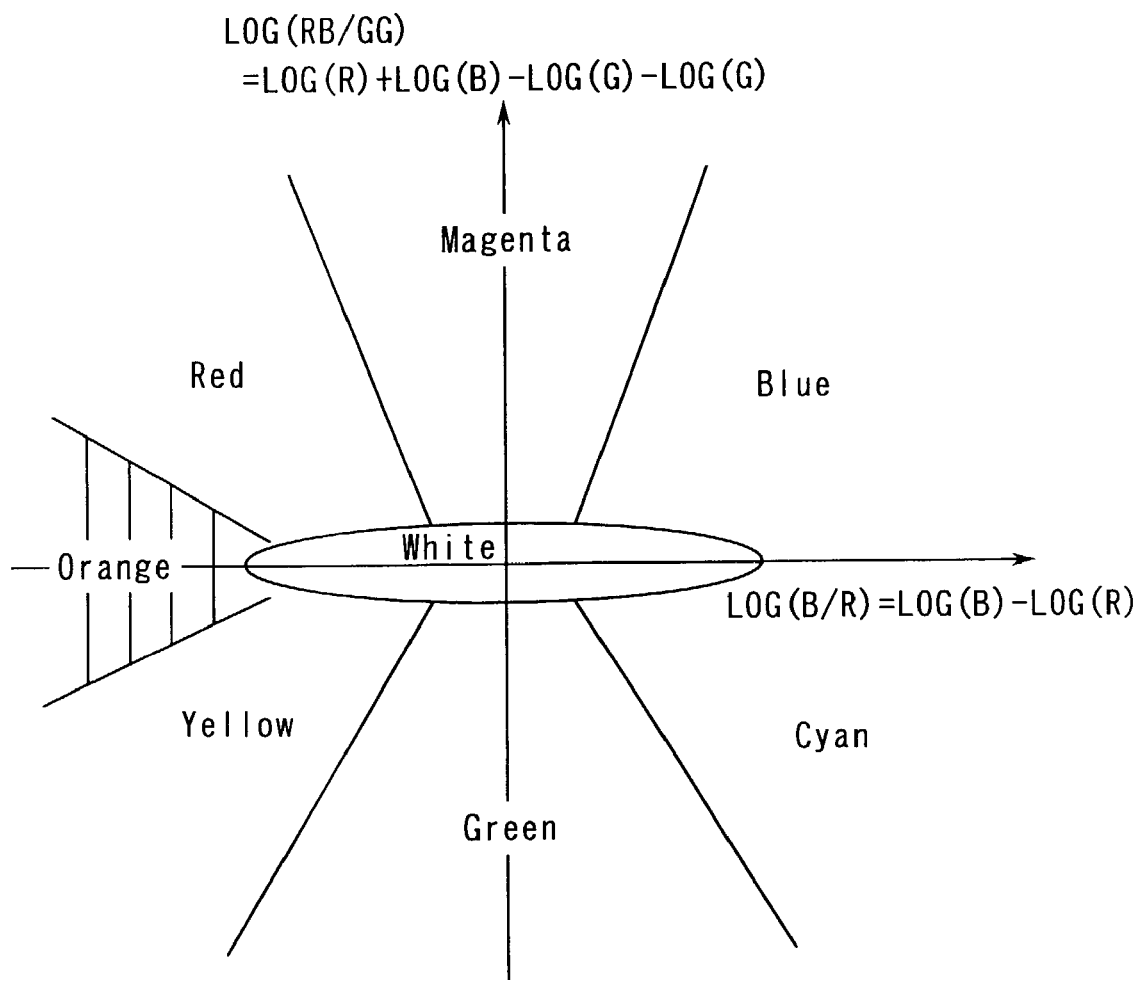
FIG. 2 is a graph for explaining a color coordinate system used in an illumination light color estimating method according to the present invention.

FIG. 2 is a graph for explaining a color coordinate system of an illumination light color estimating method according to the present invention.

As an illumination light source, a light source whose emission spectrum complies with the formula of per feet blackbody radiation, such as a candle, incandescent lamp, or sunlight, is generally used. The color of such an illumination light can be defined by using a color temperature index. For example, candle light having a low color temperature corresponds to illumination light of an orange shade. Daylight having a high color temperature corresponds to pale illumination light.

When a white object is illuminated with such a light source, the R, G, and B signals output from a solid-state image sensing element exhibit the following characteristics. When the color temperature of the light source is low, the R signal has a larger magnitude than the G signal, and the B signal has a smaller magnitude than the G signal. Conversely, when the color temperature of the light source is high, the R signal has a smaller magnitude than the G signal, and the B signal has a larger magnitude than the G signal.

More specifically, the product of R/G and B/G is constant for a white light source. Assume that the R, G, and B signals have the same level under illumination light with a color temperature of, e.g., 4,500 K. The logarithms of B/R (LOG (B/R)) are plotted along the abscissa, and the logarithms of (B/G·R/G) (LOG(RB/GG)) are plotted along the ordinate, thereby obtaining a coordinate system shown FIG. 2. In this coordinate system, along the abscissa the color temperature becomes high toward the right, and 4,500 K is set at the center of FIG. 2. Along the ordinate the green component becomes smaller upward in FIG. 2 and larger downward in FIG. 2 as compared to a white light source. This system is called a color coordinate system.

The pieces of ordinate and abscissa information of this color coordinate system are stored in, e.g., a memory in the microcomputer or in an external memory.

Coordinates in this color coordinate system can be obtained from the above average color data (average value) at a high speed. First, the logarithms of R, G, and B levels are obtained from a lookup table in accordance with the average color data. Gain correction terms corresponding to R, G, and B are added to the logarithmic values whereby logarithmically converted values LOG(R), LOG(G), and LOG(B) under illumination with a color temperature of, e.g., 4,500 K can have the same value.

On the basis of this value, color coordinates by the average color data are represented by LOG(B)−LOG(R) along the abscissa and LOG(R)+LOG(B)−LOG(G)−LOG (G) along the ordinate. Hence, once the average color data are converted into logarithms, the coordinate positions of each average color data can be obtained at a high speed only by addition/subtraction. The coordinate positions are used as data for illumination light color estimation.

The color coordinate system can be set in the above way. That is, the signal levels of the three primary color signals are equalized with respect to illumination light having a predetermined color temperature. Additionally, when the coordinate system is actually used, the position of the average color data on the color coordinates can easily be obtained.

In this color coordinate system, a white color range corresponds to a horizontally elongated elliptical region which has a color temperature distribution in the central portion. For example, blue contains a large amount of blue component relative to red and green components and is therefore located in the upper right region of the color coordinate system. Blue is thus located as a color having a high degree of saturation as the distance between that color and the origin increases.

In this coordinate system, a color based on cyan (sky blue) is located in the lower right region. A color based on green is located in the region on the lower side of the origin. A color based on yellow is located in the lower left region. A color based on orange is located in the region on the left side of the origin. A color based on red is located in the upper left region. A color based on magenta (purple) is located in the region on the upper side of the origin.

In this color coordinate system, any color has a high degree of saturation as the distance between the color and the origin increases.

Figure 3:
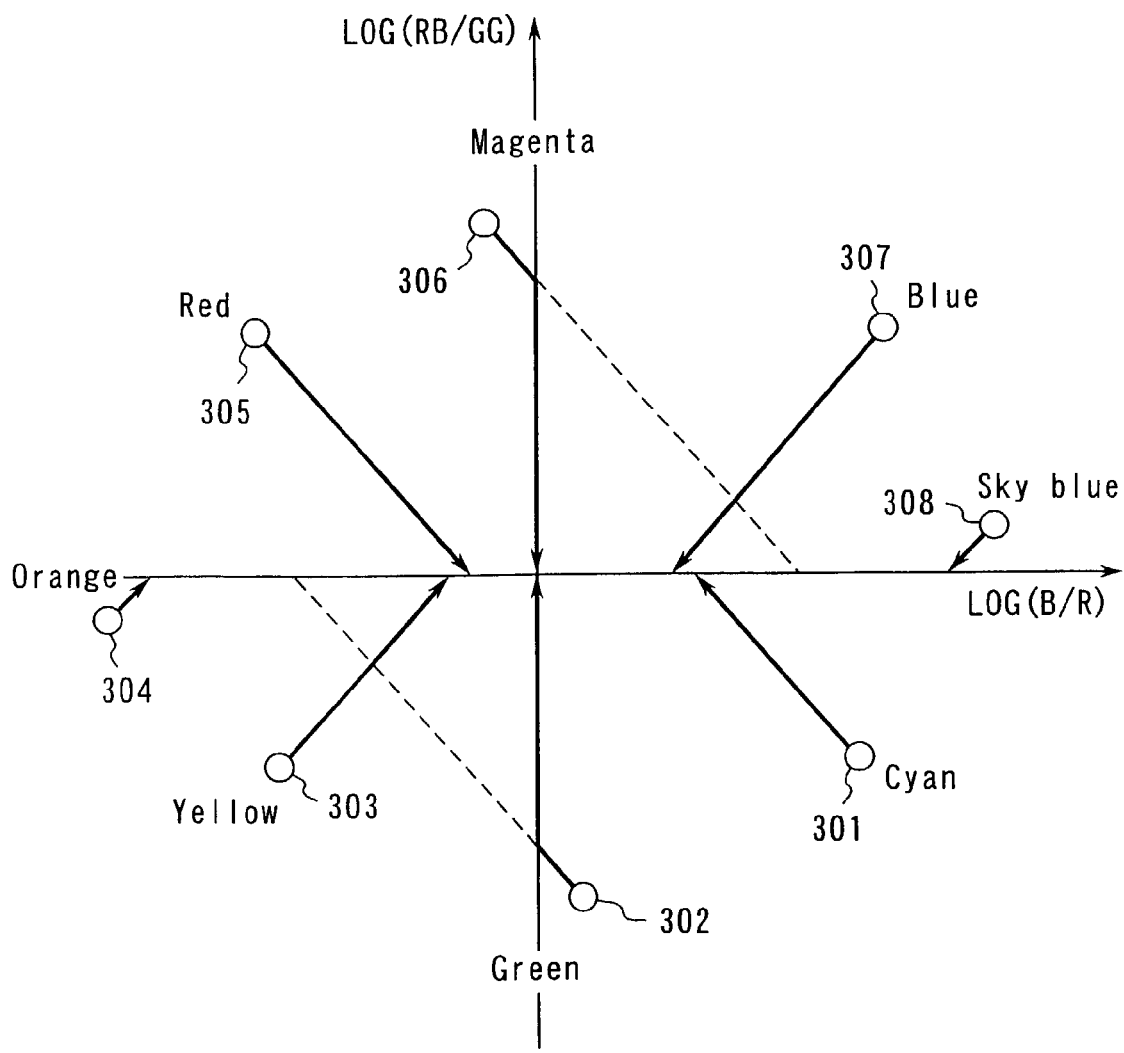
FIG. 3 is a graph for explaining the illumination light color estimating method according to the present invention.

FIG. 3 is a graph for explaining the illumination light color estimating method according to the present invention.

For example, when average color data indicates cyan 301, the green and blue components are reduced from the average color data at the same ratio. Then, a linear trace running diagonally upward to the left at 45° on the coordinate system is obtained. The intersection between this line and the abscissa is estimated as the color of the light source.

For example, when average color data indicates blue 307, the blue component is reduced from the average color data. Then, a linear trace running diagonally downward to the left at 45° is obtained. The intersection between this line and the abscissa is estimated as the color of the light source.

According to this technique, the light source has the same color as that of white illumination light with a certain color temperature. In addition, even when the color of the light source is defined as white, the color (bluish color) corresponding to the average color data is rarely reduced.

That is, in the present invention, an equalized average value of three primary color signals from the image sensing element is obtained. One of the resultant red and blue signals obtained on the basis of the average value, which has higher level, is specified as a signal of interest (the color 301 or 307 in the above example). Next, the red signal is multiplied by the blue signal, and the resultant signal is divided by the green signal to obtain coordinate values. When the green signal is larger than the resultant coordinate values (ordinate LOG(RB/GG)) (for the cyan-based color 301 in the above example), the signal of interest is reduced together with the green signal at the same ratio. Conversely, when the green signal is smaller than the coordinate values (for the blue 307 in the above example), only the signal of interest is reduced. This reduction processing is also called color appearance reduction.

A color corresponding to coordinate points (i.e., the abscissa in the example shown in FIG. 3) at which the coordinate values (geometric average) of the signal of interest obtained by the reduction processing has the same level as that of the green signal value is estimated as the color of illumination light.

When average color data indicates green 302 close to cyan, the cyan component is reduced from the average color data. That is, a line (broken line) is drawn diagonally upward to the left at 45° to obtain an intersection between the line and the abscissa. Then, the sign of the color temperature is negative, i.e., different from the sign of color temperature coordinates of the average color data. In this case, the value of the abscissa for illumination light color estimation is set to 0.

When a white reference is defined on the basis of the color coordinates of the light source in the above way, the average color data can be output as a signal that has good white balance with respect to the green close to cyan.

When average color data indicates red 305, the red component is reduced from the average color data. That is, a line is drawn diagonally downward to the right at 45°. The intersection between this line and the abscissa is estimated as the color of the light source. According to this technique, the light source has the same color as that of white illumination light with a certain color temperature. In addition, even when the color of the light source is supposed to as white, the color (reddish color) corresponding to the average color data is rarely reduced in fact.

When average color data indicates red 306 close to magenta, the magenta component is reduced from the average color data. That is, a line (broken line) is drawn diagonally downward to the right at 45° to obtain an intersection between the broken line and the abscissa. In this case, the sign of the color temperature is negative, i.e., different from the sign of color temperature coordinates of the average color data. If the different sign of the color temperature is used, color appearance differ from that by the average color data. In this case, the value of the abscissa for illumination light color estimation is set to 0.

The illumination light color estimating method is expressed as follows. Let (t,m) be the coordinate positions of average color data in the color coordinate system. Then, the coordinate positions of a light source are given by when t>0, $$\max(t-\mathrm{ABS}(m),0) \qquad (1)$$

when t<0, $$\min(t+\mathrm{ABS}(m),0) \qquad (2)$$

where ABS( ) is a function for returning the absolute value of an argument, max( ) is a function of obtaining a maximum value, and min( ) is a function of obtaining a minimum value. That is, expression (1) yields a result obtained by subtracting the absolute value of m from t when t is larger than 0. Expression (2) yields a result obtained by adding the absolute value of m from t when t is smaller than 0. However, when the result has a positive value, the result is forcibly set to 0.

The coordinate positions of the thus estimated illumination light color are defined as (Kt,Km), and the white balance gains of R and B signals at a color temperature of 4,500 K are defined as $Ar_0$ and $Ab_0$. Gains Ar and Ab of the R amplifier 107 and B amplifier 108 are controlled by $$Ar = Ar_0 \cdot \mathrm{EXP}((Kt-Km)/2) \qquad (3)$$

$$Ab = Ab_0 \cdot \mathrm{EXP}((-Kt-Km)/2) \qquad (4)$$

With the above control, R, G, and B signals having the same level are obtained with respect to a white object illuminated with a white light source within a predetermined color temperature range.

On the other hand, to maintain the atmosphere of illumination, the coordinate values of the illumination light color in the direction of color temperature are multiplied by a reduction ratio C. That is, the gains Ar and Ab given by $$Ar = Ar_0 \cdot \mathrm{EXP}((C \cdot Kt-Km)/2) \qquad (5)$$

$$Ab = Ab_0 \cdot \mathrm{EXP}((-C \cdot Kt-Km)/2) \qquad (6)$$

are controlled by equations (3) and (4).

With this processing, the white balance gains can also be set to a desired balance.

The reduction ratio C is set to a value between C=0.5 and C=1.0. That is, the reduction ratio C is preferably set to a value between C=0.5 at which white color appears on the screen as almost the same color as that of an object under illumination and C=1.0 at which white color appears on the screen as an actual object color.

That is, the above processing corresponds to setting the 1/2 to first power of the reciprocal of the ratio of the red and blue component amount to the green component amount of estimated illumination light color as the gains of the red and blue signals.

The signals whose levels are equalized in the above manner are subjected to gamma correction processing, edge correction processing, conversion into a luminance (Y) signal, and conversion into color difference signals (R−Y) and (B−Y) by the camera process circuit (including matrix processing) 109. With the above arrangement, the present invention can realize a solid-state image sensing apparatus having an automatic white balance function.

Figure 4:
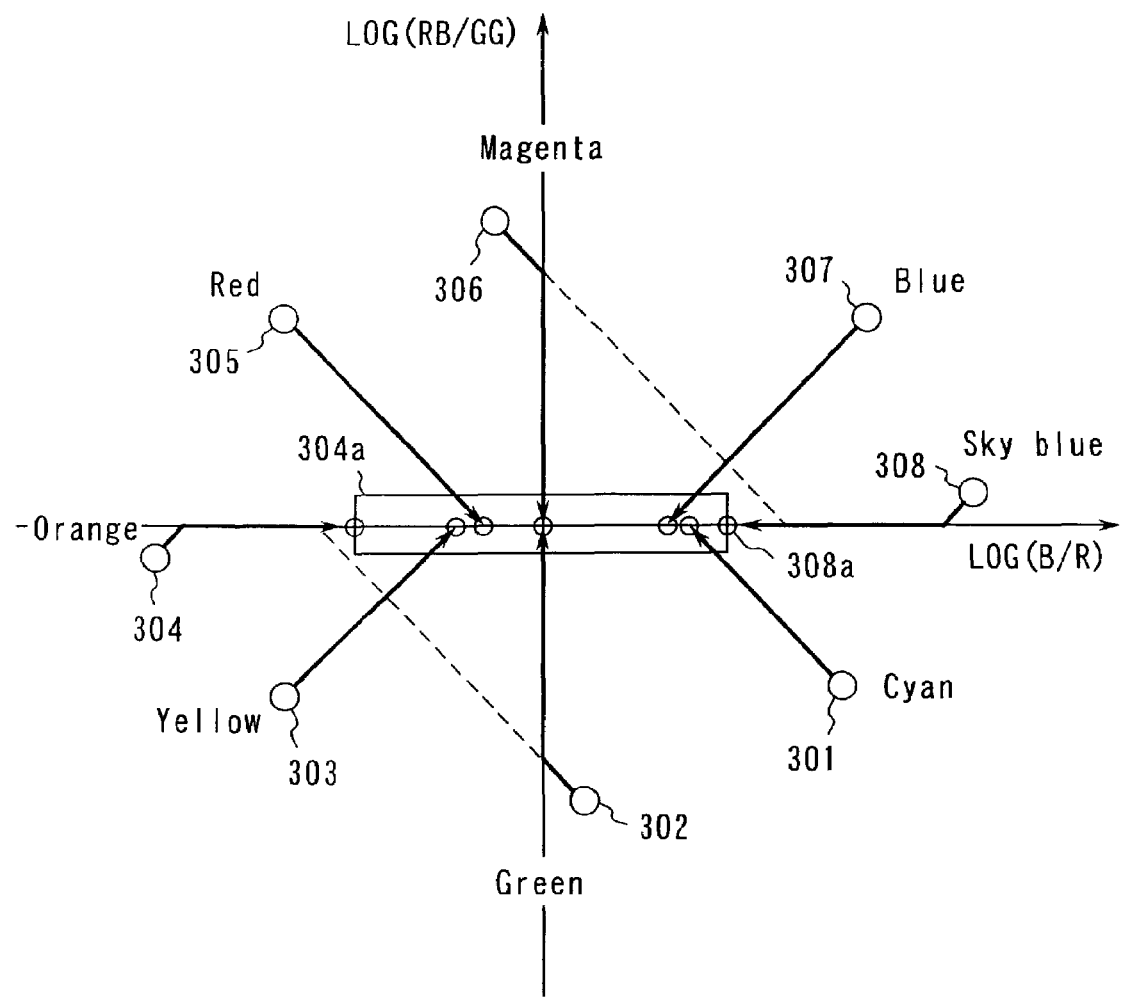
FIG. 4 is a graph for explaining an illumination light color estimating method according to the second embodiment of the present invention.

FIG. 4 is a view for explaining the second embodiment of the present invention.

In this embodiment, the tracking color temperature range of white balance is restricted. For example, the orange color in an evening glow or the color of a blue sky has color coordinate values close to the abscissa of the coordinate system. Hence, the color becomes light when the color of illumination light is simply estimated as shown in FIG. 3.

The color temperature of generally used white illumination light is limited to 3,000 K (studio light) to 10,000 K (overcast). Hence, to obtain an image sensing state under general white illumination light, the method of the above-described embodiment can be appropriately used. However, under illumination having a low color temperature (incandescent lamp or candle), it is preferable to sense an image under the environment of slightly reddish illumination light with a warm tone. Under a blue sky having a high color temperature (about 15,000 K), it is sometimes preferable to sense an image under the environment of blue illumination light.

In this case, a color temperature range is preferably set as a condition for illumination light color estimation. When white balance is set at 4,500 K, R and B signals within the color temperature range of 3,000 K to 10,000 K are inversely proportional to each other and respectively have about 2/3 to 1.5 variation amounts. For this reason, R/B becomes 1/(2·1) to 2.2 times.

Hence, when the coordinates of average color data are defined as (t,m), the estimated coordinate values of a light source are preferably obtained by when t>0, $$\min(\max(t-ABS(m),0),LOG(2,2)) \qquad (7)$$

when t<0, $$\max(\min(t+ABS(m),0),-LOG(2,2)) \qquad (8)$$

When expressions (7) and (8) are employed, even an image under the orange color in an evening glow or the color of a blue sky can be reproduced. That is, in expression (7), the maximum value is restricted by LOG(2,2) to regulate the upper limit of the color temperature of a light source with white balance, unlike expression (1). In expression (8), the minimum value is restricted by −LOG(2,2) to regulate the lower limit of the color temperature of a light source with white balance, unlike expression (2).

That is, when average color data has a value 301, 302, 303, 305, 306, or 307, the color of illumination light is estimated in accordance with the same procedure as in the example shown in FIG. 3. However, when average color data has a value 308, the maximum value (308a) of a rectangular frame (color temperature range) on the color coordinate system is estimated to be the color of illumination light. When average color data has a value 304, the minimum value (304a) of the rectangular frame (color temperature range) on the color coordinate system is estimated to be the color of illumination light.

With this technique, the data estimation range along the abscissa is restricted. Under illumination having a low color temperature (incandescent lamp or candle), an image under slightly reddish illumination light with a warm tone is obtained. Under a blue sky having a high color temperature (about 15,000 K), a blue image is obtained.

Figure 5:
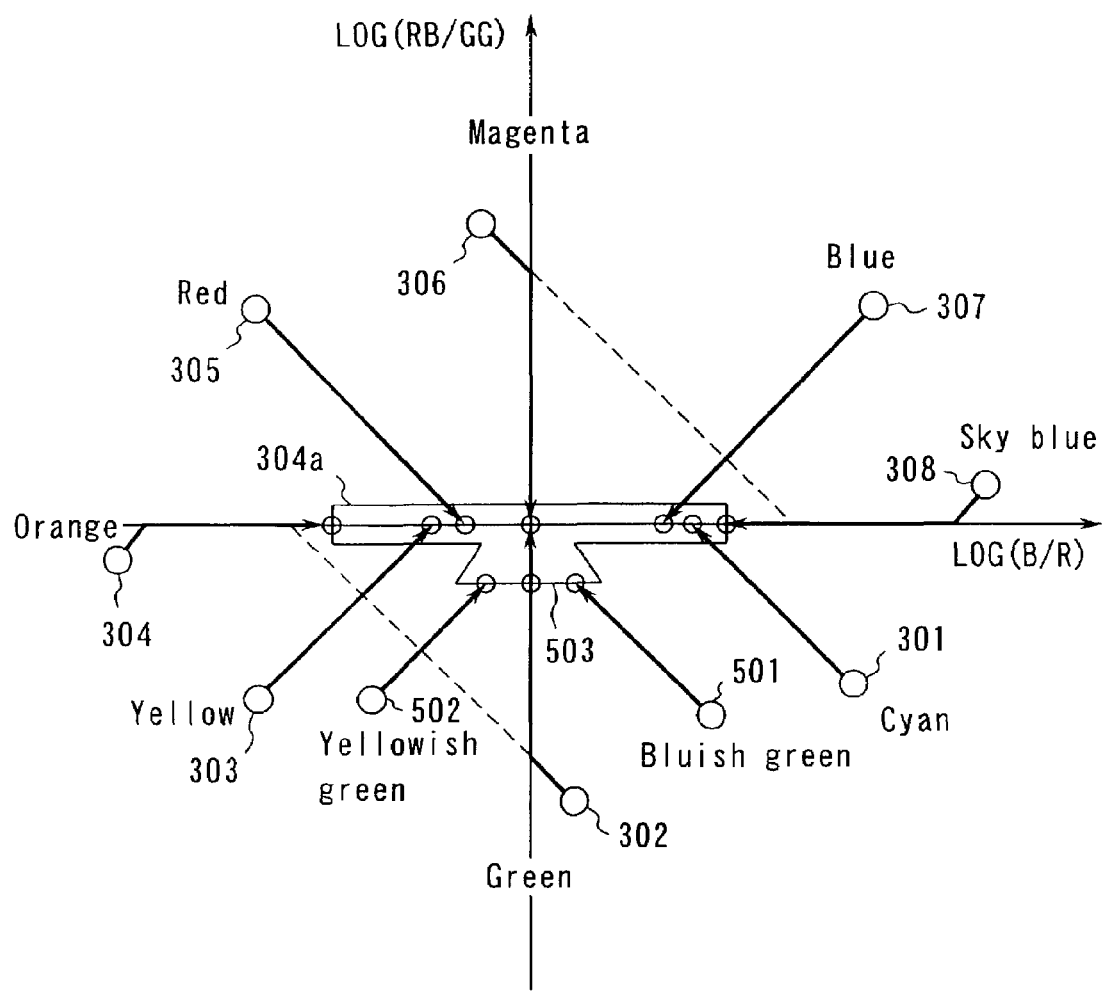
FIG. 5 is a graph for explaining an illumination light color estimating method according to the third embodiment of the present invention.

FIG. 5 is a graph for explaining the third embodiment of the present invention. FIG. 5 shows a method of estimating the color of illumination light in consideration of a fluorescent lamp as an illumination light source. The emission color of a fluorescent lamp is determined by the ratio of phosphors. A daylight or white color fluorescent lamp is designed to contain a larger amount of green component than perfect blackbody radiation with the same color temperature.

For this reason, an image photographed under a fluorescent lamp tends to be greenish. To avoid this, in estimating the color of illumination light from the green side, as shown in FIG. 5, the color of illumination light is estimated using a predetermined window (color temperature range) (4,000 K to 7,000 K). Then the color of illumination light is estimated while leaving the green component of level 503 in FIG. 5. White balance is controlled assuming that the greenish data is white (reference). Hence, the whole screen can be prevented from becoming greenish.

Figure 6:
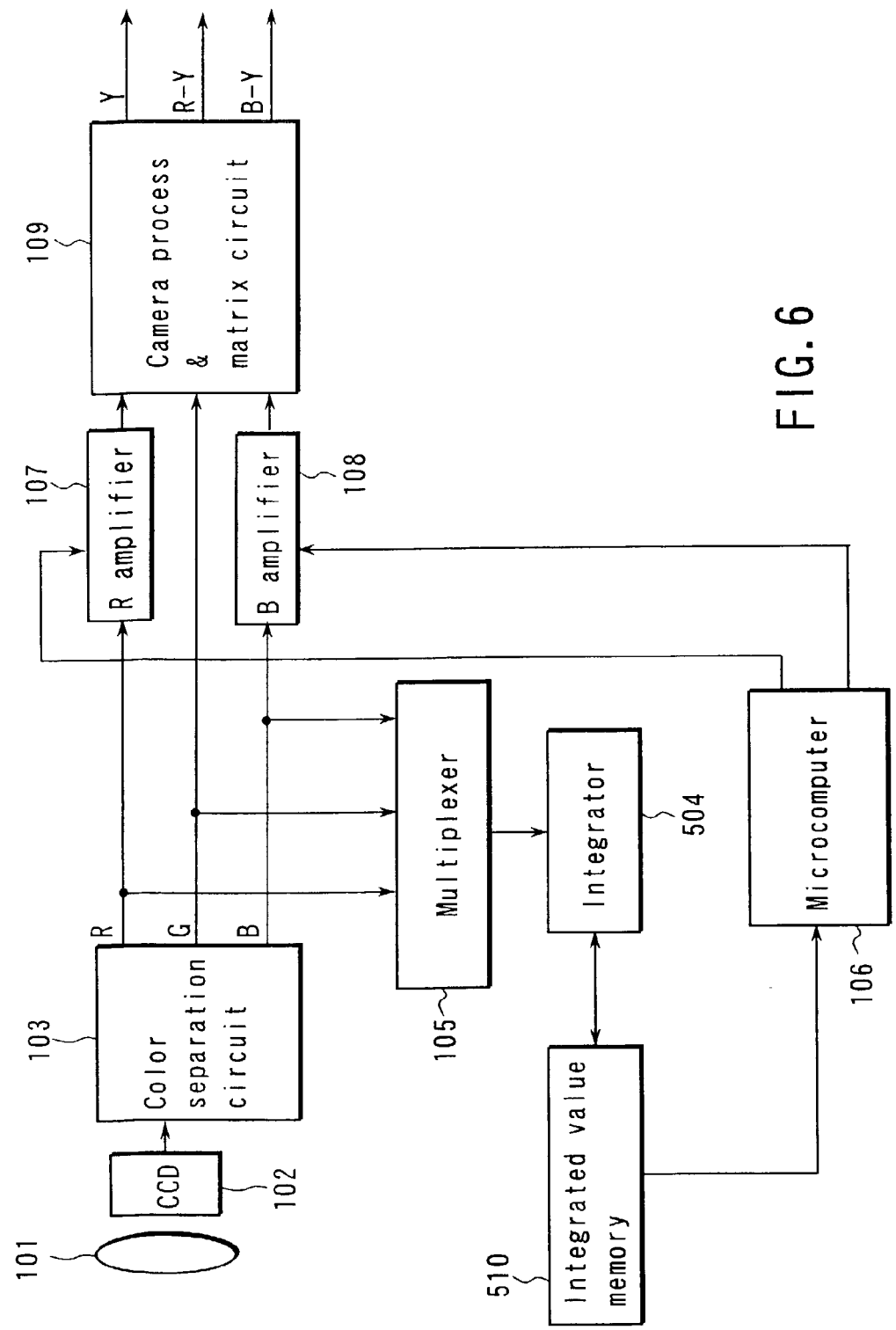
FIG. 6 is a block diagram showing an image sensing apparatus so as to explain the fourth embodiment of the present invention.

FIG. 6 is a block diagram for explaining the fourth embodiment of the present invention. In FIG. 6, the same reference numerals as in FIG. 1 denote the same functional blocks, and a description thereof will be made below. A multiplexer 105 sequentially receives R, G, and B signals and supplies them to an integrator 504. An integrated value memory 510 holds the integrated values of the R. G, and B signals for a plurality of image blocks.

That is, the integrator 504 sequentially adds a corresponding chrominance signal to the integrated value of each chrominance signal of an image block in the integrated value memory 510. With this operation, average color data for each image block is formed in the integrated value memory 510.

In this embodiment, a memory must be added, unlike the above embodiments, resulting in a larger hardware scale. However, as an advantage of white balance determination based on a plurality of image blocks, the estimated illumination light color for the entire image can be weighted preferentially using illumination light color obtained (estimated) from a block that appears to be whiter.

Figure 7:
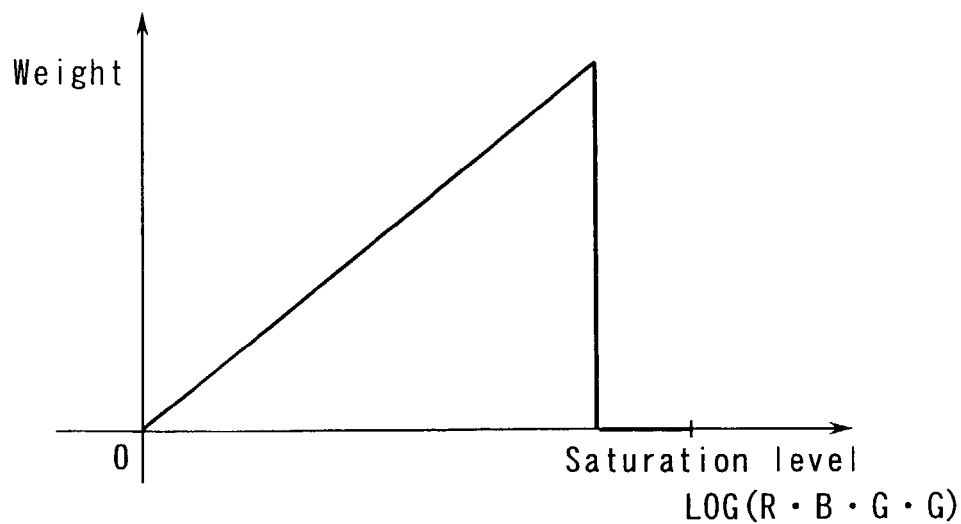
FIG. 7 is a graph for explaining the relationship between the brightness and the weight set in the apparatus shown in FIG. 6 as determination factors for illumination light color estimation.

FIG. 7 is a view showing the relationship between the brightness and the weight. The abscissa is an axis of LOG(RBGG) which represents brightness. For this axis, a G signal is multiplied twice (squared) to increase the contribution ratio of the G signal that is close to human visual sensitivity. When R and B are also multiplied, like G, a larger weight can be set for a block having a low degree of color saturation.

A LOG function that multiplies elements (e.g., R, B, G, G) corresponds to the sum of LOG functions of the elements. Hence, a value on the abscissa can easily be obtained by addition/subtraction of LOG function values of R, G, and B signals, which is used to estimate the color of illumination light. A small weight is set for a dark block having a low S/N ratio and a large weight for a bright block having a high S/N ratio, thereby reducing an error in illumination light color detection.

For a block close to the saturation level of a solid-state image sensing element, at which the linearity of a signal is lost, the weight is decreased because the average color data probably indicates a different color.

Figure 8:
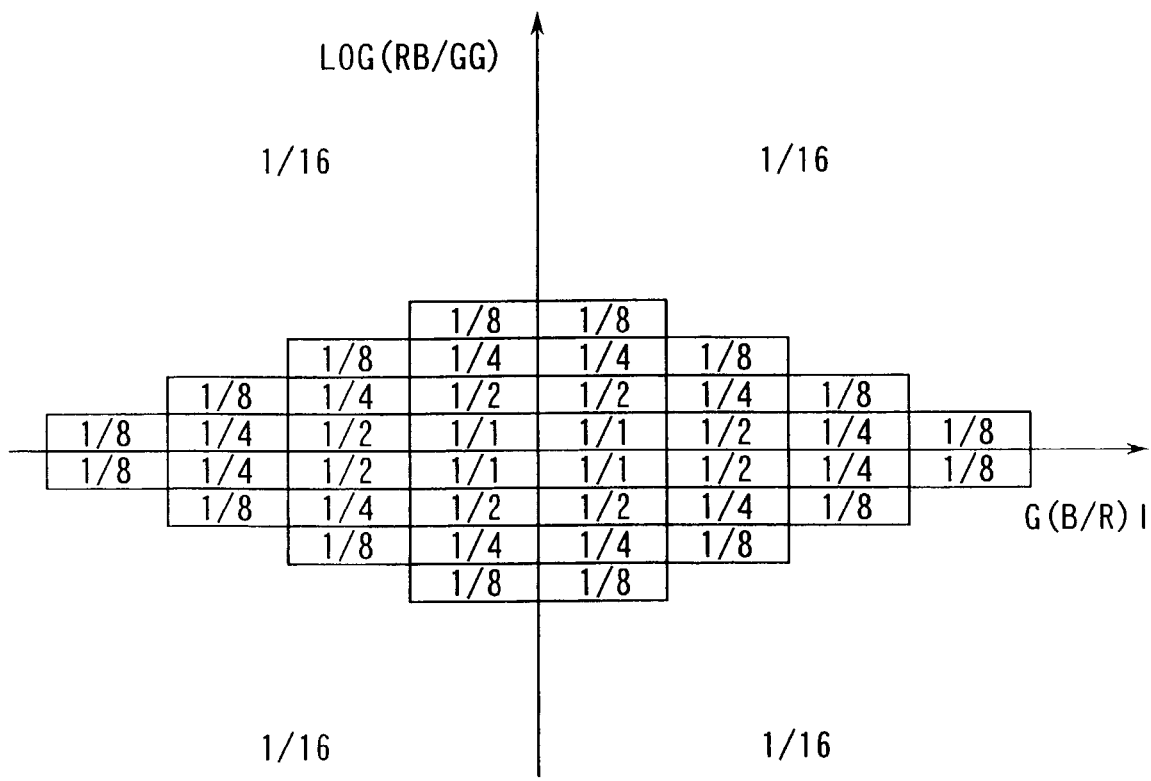
FIG. 8 is a graph showing an example of weighting which is taken into consideration in estimating the color of illumination light in the apparatus shown in FIG. 6.

FIG. 8 shows an example in which a weight for average color data is changed in accordance with the value of average color data. Numerical values in FIG. 8 indicate weights. FIG. 8 shows a color coordinate system with LOG(RB/GG) plotted along the ordinate and LOG(B/R) plotted along the abscissa. This color coordinate system is the same as that used for illumination light color estimation above. Calculation of color coordinates of a block on the color coordinate system has been completed in the microcomputer. Hence, even when weighting processing is executed, the total processing time required to obtain gain control signals rarely increases.

The origin of this color coordinate system indicates white color having a color temperature of, e.g., 4,500 K. The degree of color saturation increases as the distance from the origin increases. Hence, a large weight is set for a color close to the origin and a small weight for a color separated from the origin. With this processing, a block having a low degree of color saturation can be preferentially used for illumination light color estimation.

In this way, an estimated light source color is obtained for each block. Weighted values are integrated for all blocks. The integrated value is divided by the total number of weights, thereby estimating the illumination light color over the entire screen. White balance is set on the basis of the estimated illumination light color. Thus, a solid-state image sensing apparatus having an automatic white balance function, which can obtain an image having natural white balance, can be implemented.

Figure 9:
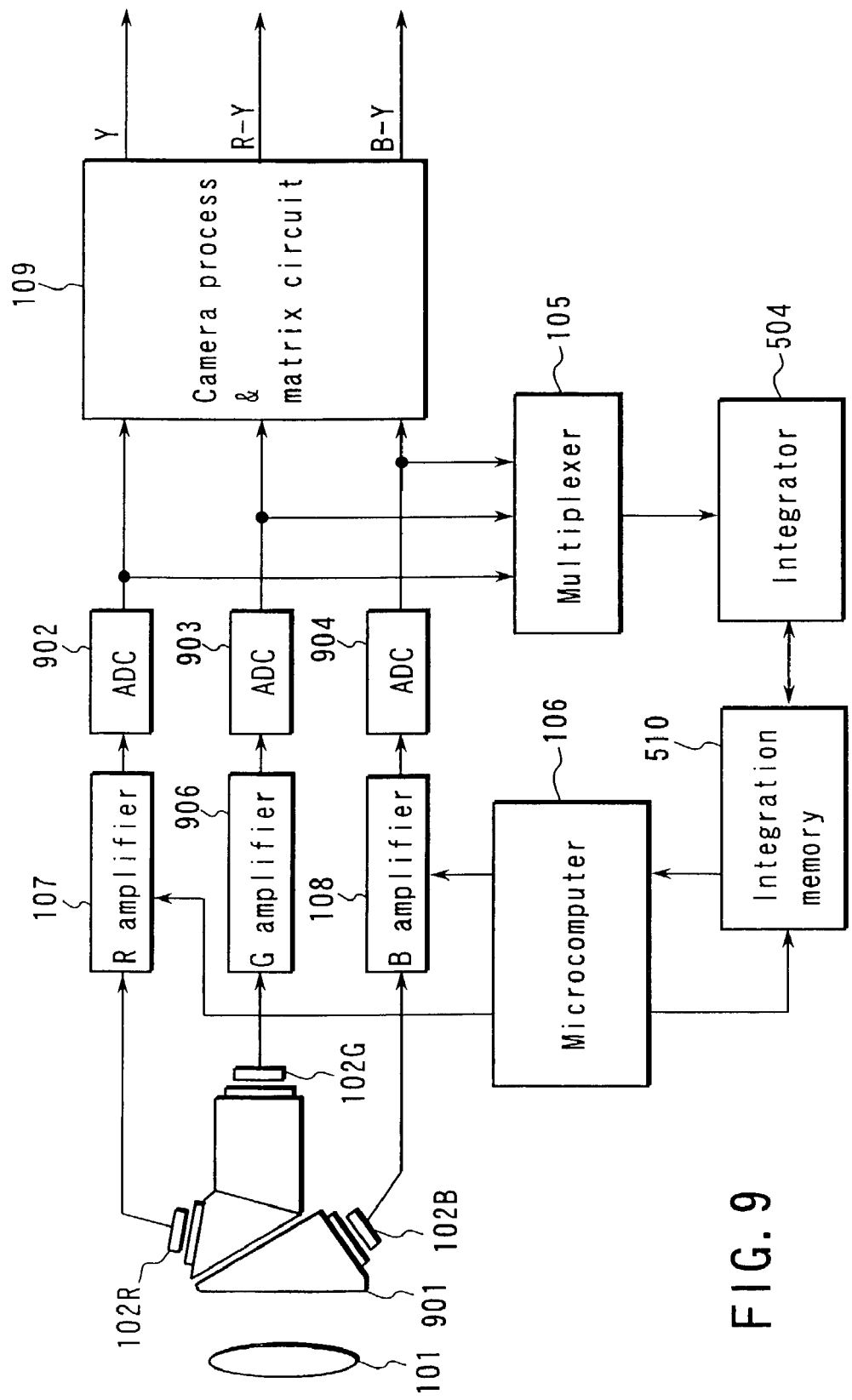
FIG. 9 is a block diagram showing an image sensing apparatus for explaining the fifth embodiment of the present invention.

FIG. 9 is a block diagram for explaining the fifth embodiment of the present invention. In FIG. 9, the same reference numerals as in FIG. 6 denote the same functional blocks, and a description thereof will be made below.

A light image formed by a lens 101 is separated into light images of three primary colors by a color separation optical system 901. The light images are formed on three solid-state image sensing elements 102R, 103G, and 103B, respectively. Image signals of R, G, and B signals are output from the solid-state image sensing elements 102R, 103G, and 103B, respectively. The image signals are amplified by an R amplifier 107, G amplifier 906, and B amplifier 108 and input to A/D converters 902 to 904, respectively. The R amplifier 107, G amplifier 906, and B amplifier 108 equalize the signal levels such that the resolving powers of the A/D converters 902 to 904 can be effectively used.

The G amplifier 906 uses a fixed gain. The gains of the R amplifier 107 and B amplifier 108 are appropriately controlled by a microcomputer 106, thereby obtaining white balance. Hence, gain set values $Ar_1$ and $Ab_1$ of the R amplifier 107 and B amplifier 108 are in the microcomputer 106.

In logarithmically converting integrated values $(R_i, G_i, B_i)$ of chrominance signals of each block, which are obtained by a multiplexer 105, integrator 504, and integration memory 510, LOG(R), LOG(G), and LOG(B) are gain-corrected by $$LOG(R) = LOG(R_i / Ar_1 \cdot Ar_0)$$
$$= LOG(R_i) + LOG(Ar_0) - LOG(Ar_1)$$
$$LOG(G) = LOG(G_i)$$

$$LOG(B) = LOG(B_i / Ab_1 \cdot Ab_0)$$
$$= LOG(B_i) + LOG(Ab_0) - LOG(Ab_1)$$

With these calculations, the logarithmic values of the R, G, and B signal levels are obtained under the condition of gains $(Ar_0, Ab_0)$ at a predetermined color temperature.

On the basis of the logarithmic values, the color of illumination light can be estimated. After the color of illumination light is estimated, the gains of the R amplifier 107 and B amplifier 108 are further controlled. With this arrangement, a solid-state image sensing apparatus having an automatic white balance function can be implemented.

As described above, according to the illumination light color estimating method for white balance of the present invention, white balance adjustment can be realized by reducing a strong color component of three primary color signals from a color in an image and setting the color of the light source on the video (the color over the entire screen) while maintaining the color appearance.

According to an image sensing apparatus using the illumination light color estimating method for white balance of the present invention, illumination light color estimation can be made possible to realize white balance adjustment by reducing a strong color component of three primary color signals from a color in an image and maintaining the color appearance of the light source. Thus, the apparatus can satisfactorily perform white balance.

The present invention is not limited to the above embodiments.

In the above embodiments, as a technique of estimating a light source color, the color temperature range is restricted on a color coordinate system. An embodiment to be described below shows another technique of restricting the color temperature range. In this technique, the number of types of weighting elements for average color data is increased.

Generally, when an object is photographed under illumination light of a home fluorescent lamp, a greenish image is obtained. This is because the emission color of illumination light of a fluorescent lamp contains a larger amount of green component than an incandescent light source. To set white balance under illumination light of a fluorescent lamp, the slice level for a color difference signal is preferably shifted (increased) to the green side. However, when the slice level is shifted to the green side, in an outdoor photography mode, the increased green component of trees, etc., makes the green lighter than is actually so. In addition, white changes to light magenta.

In this embodiment, an illumination light color estimating method for automatic white balance, for both prevention of unwanted color-lightening and prevention of mistaking an outdoor scene photographing mode for a fluorescent lamp illumination mode, is realized.

The basic concept of the present invention will be explained again. The basic concept of the present invention is the same as that described with reference to FIGS. 2 and 3.

Figure 10:
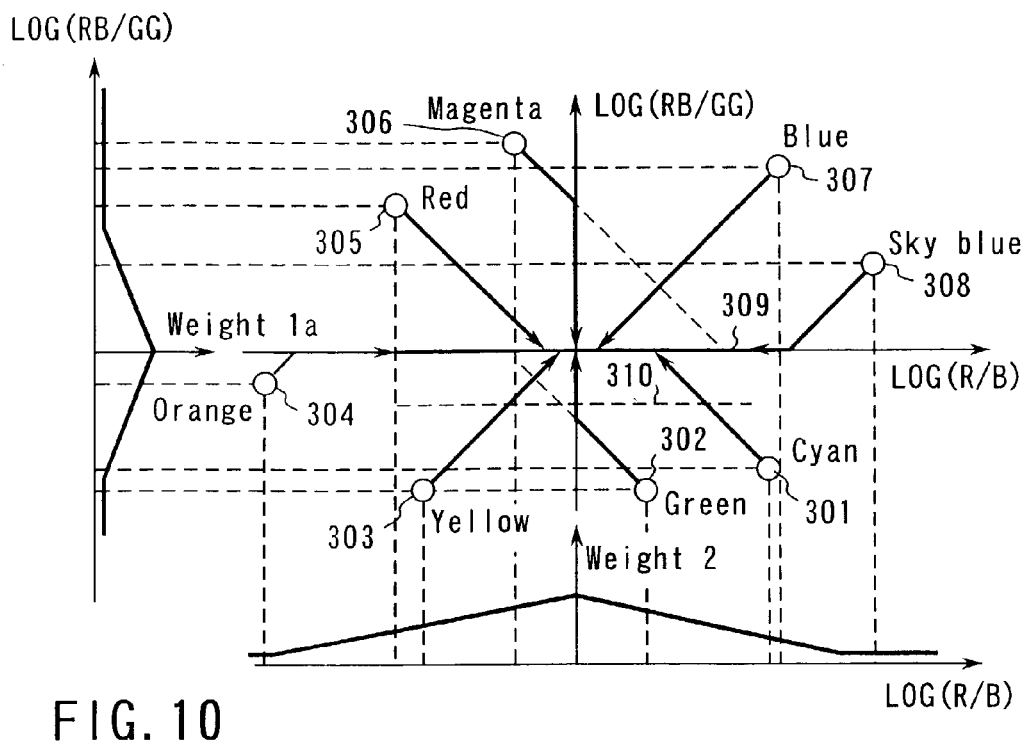
FIG. 10 is a graph for explaining another embodiment of the illumination light color estimating method according to the present invention.

FIG. 10 shows an example in which, in estimating an illumination light color, the number of types of weighting elements for average color data is increased. The background from which the illumination light color estimating method is derived will be described again. This illumination light color estimation assumes illumination of an incandescent light source system. A bold line 309 along the abscissa indicates the range of an incandescent light source illumination color having a color temperature of, e.g., 3,000 K to 10,000 K. A line (dotted line) 310 obtained by translating the bold line 309 downward is a reference line used to estimate the color of illumination light when the illumination light source is assumed to be a fluorescent lamp (with a strong green component). When the light source is assumed to be an incandescent light source, the reference line 310 is not used. An example using the reference line 310 will be described later.

That is, as described above, the color temperature of generally used white illumination light is limited from 3,000 K (studio light) to 10,000 K (overcast) from to 2,800 K (incandescent lamp) to 10,000 K (overcast). Hence, to obtain an image sensing state under general white illumination light, the method of the above-described embodiment can be appropriately used. However, under the environment of illumination having a low color temperature (incandescent lamp or candle), it is preferable to sense an object as an image under the environment of slightly reddish illumination light with a warm tone. Under the environment of a blue sky having a high color temperature (about 15,000 K), it is sometimes preferable to sense an object as an image under the environment of blue illumination light.

Hence, a color temperature range is preferably set as a condition for illumination light color estimation. When white balance is set at 4,500 K, relation of R and B signals within the color temperature range of 2,800 K to 10,000 K show inversely proportional, and variation amounts of each signals, show about 2/3 to 1.5. For this reason, R/B becomes 1/2.1 to 2.2 times. Hence, if the coordinates of average color data are defined as (t,m), the estimation coordinate system of a light source is restricted to when t>0, $$\min(\max(t-ABS(m),0),LOG(2)) \quad (7)$$

when t<0, $$\max(\min(t+ABS(m),0),-LOG(2)) \quad (8)$$

That is, for sky blue 308, the maximum value is restricted to LOG(2) by expression (7) to regulate the upper limit of the color temperature of a light source with white balance, thereby reproducing sky blue. For orange 304, the minimum value is restricted to −LOG(2) by expression (8) to regulate the lower limit o the color temperature of a light source with white balance, thereby reproducing an evening glow.

In this way, for the illumination light color estimated for each block, a weight is set large for a block corresponding to white. All the values are added and averaged, thereby more reliably estimating the illumination light color.

A graph on the left side of FIG. 10 indicates an evaluation value (weight 1a) that represents, in the direction of magenta-green, the nearness of a color corresponding to the average color data of each block to white. A graph on the lower side of FIG. 10 indicates an evaluation value (weight 2) that represents the nearness of average color data of each block and a color temperature corresponding to the average color data to 4,500 K.

Figure 11:
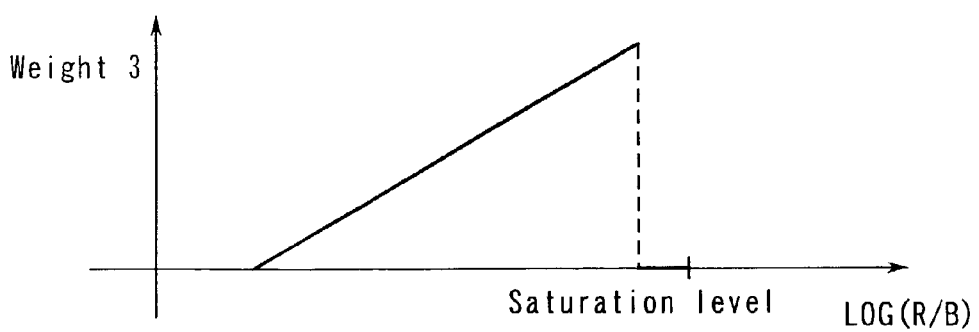
FIG. 11 is a graph for explaining the relationship between the brightness and the weight employed for the estimating method shown in FIG. 10 as determination elements for illumination light color estimation.

FIG. 11 shows the relationship between the brightness and a weight 3 of a block. The abscissa represents brightness. A G signal is multiplied twice to increase the contribution ratio of the G signal that is close to human visual sensitivity. When R and B are also multiplied, like G, a larger weight can be set for a block having a low chroma. A LOG function of multiplication corresponds to the sum of LOG functions of multiplication elements. Hence, a value on the abscissa can easily be obtained by addition/subtraction of LOG function values of R, G, and B signals, which is used to estimate the color of illumination light. A small weight is set for a dark block having a low S/N ratio and a large weight for a bright block having a high S/N ratio, thereby reducing errors in illumination light color detection. In addition, for a block close to the saturation level of a solid-state image sensing element, at which the linearity of a signal is lost, the weight is decreased because the average color data probably indicates a different color.

The thus obtained product of weights given by (weight 1a)×(weight 2)×(weight 3)

can be set large for a bright and light, i.e., white portion.

In this way, an estimated light source color is obtained for each block. Weighted values are integrated for all blocks. The integrated value is divided by the total number of weights, thereby estimating the illumination light color over the entire screen, assuming that the illumination is an incandescent light source.

The above-described illumination light color estimation shown in FIG. 10 assumes illumination light of an incandescent light source system.

Figure 12:
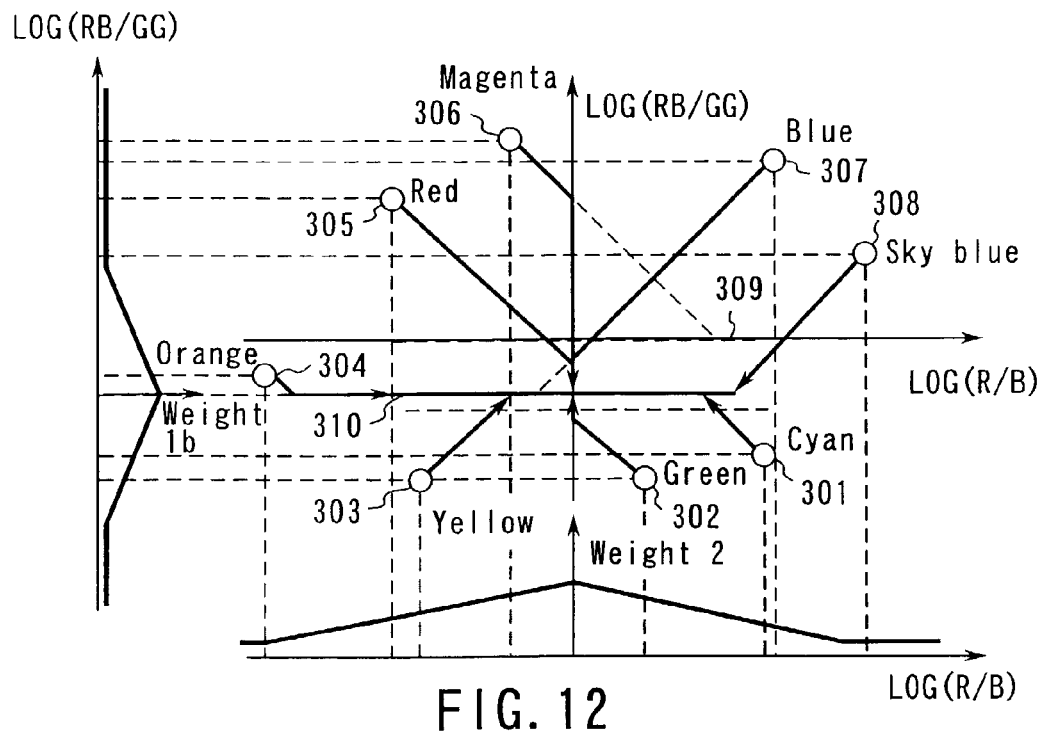
FIG. 12 is a graph for explaining still another embodiment of the illumination light color estimating method according to the present invention.

To the contrary, FIG. 12 is a graph for explaining a technique of estimating an illumination light color from average color data of each block assuming that illumination is illumination light of a fluorescent lamp.

FIGS. 12 is different from FIG. 10 in that a target value after color appearance reduction is shifted to the green side as compared to that for an incandescent light source and the peak of a weight 1b is also shifted to the green side. That is, a color component is subtracted from average color data to obtain not the intersection between a resultant line and the abscissa 309 but the intersection between a resultant line and the abscissa 310. With this operation, the illumination light color can be estimated as greenish fluorescent illumination.

In the examples shown in FIGS. 10 and 12, whether the light source is an incandescent light source or a fluorescent lamp is determined in advance, and then, the illumination light color is estimated. However, the present invention is not limited to such an estimating method. A means for estimating the color of illumination light while automatically determining whether the illumination light is illumination light of an incandescent light source or illumination light of a fluorescent lamp may be prepared.

Figure 13:
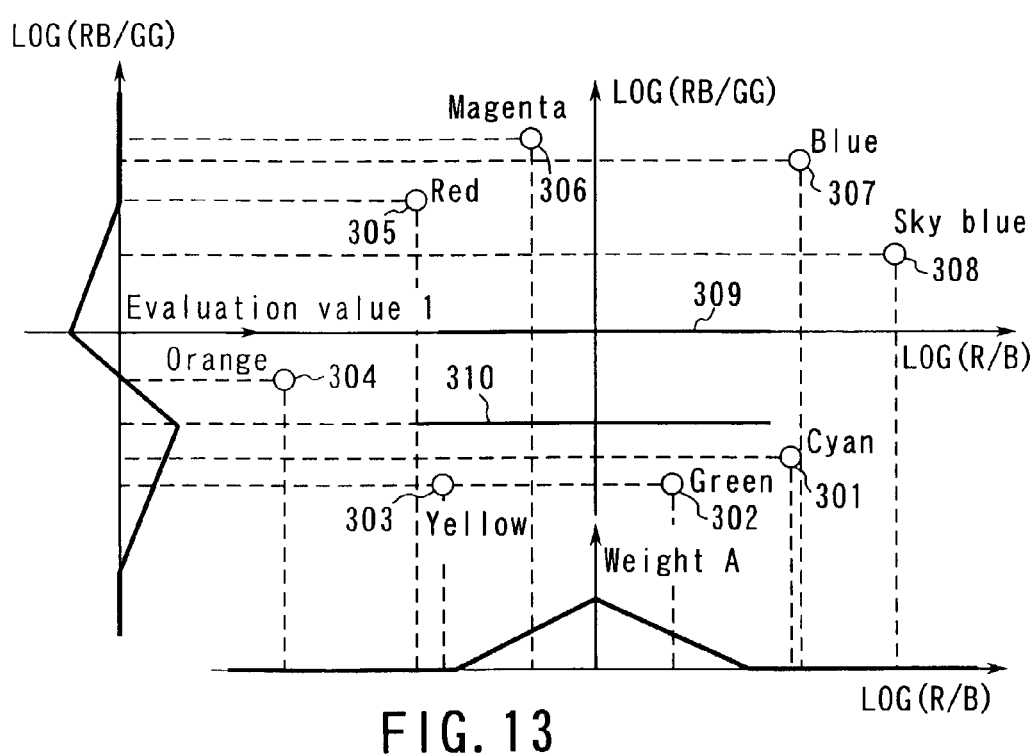
FIG. 13 is a graph for explaining still another embodiment of the illumination light color estimating method according to the present invention.

FIG. 13 is a graph for explaining a method of obtaining an index used to determine whether a light source is an incandescent light source or a fluorescent lamp.

As a characteristic of an evaluation value 1, the evaluation value 1 becomes positive when it is determined on the basis of the value of average color data of each block in the direction of magenta-green that illumination light is greenish like a fluorescent lamp, and negative when the light source can be estimated as an incandescent light source. The evaluation value 1 indicates the possibility of fluorescent lamp illumination by having a positive or negative value. In addition, when the evaluation value 1 is decreased as the ratio of magenta and green components becomes high, a block where an object of a dark color is photographed can be inhibited from being used for discrimination of the type of illumination light source.

Figure 14:
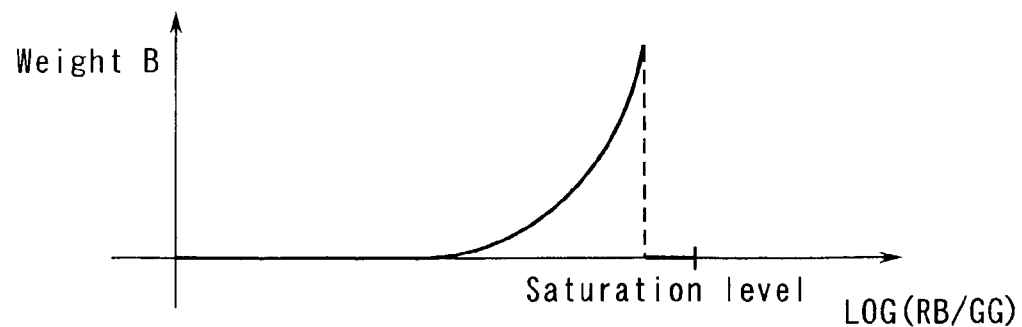
FIG. 14 is a graph for explaining the relationship between the brightness and the weight employed for the estimating method shown in FIG. 13 as determination factors for illumination light color estimation.

Additionally, in accordance with the color temperature direction component of average color data of each block, a value (weight A) that increases the weight of a block near 4,500 K or a value (weight B) shown in FIG. 14, which increases the weight of a bright block that is probably a white block, is added.

If the weight added value is a positive value, it can be determined that the illumination light is illumination light of a fluorescent lamp at a high probability. At this time, the horizontal line 310 is used as a reference line. Conversely, if the weight added value is a negative value, it can be determined that the illumination light is illumination light of an incandescent light source at a high probability. At this time, the horizontal line 309 is used as a reference line.

Figure 15:
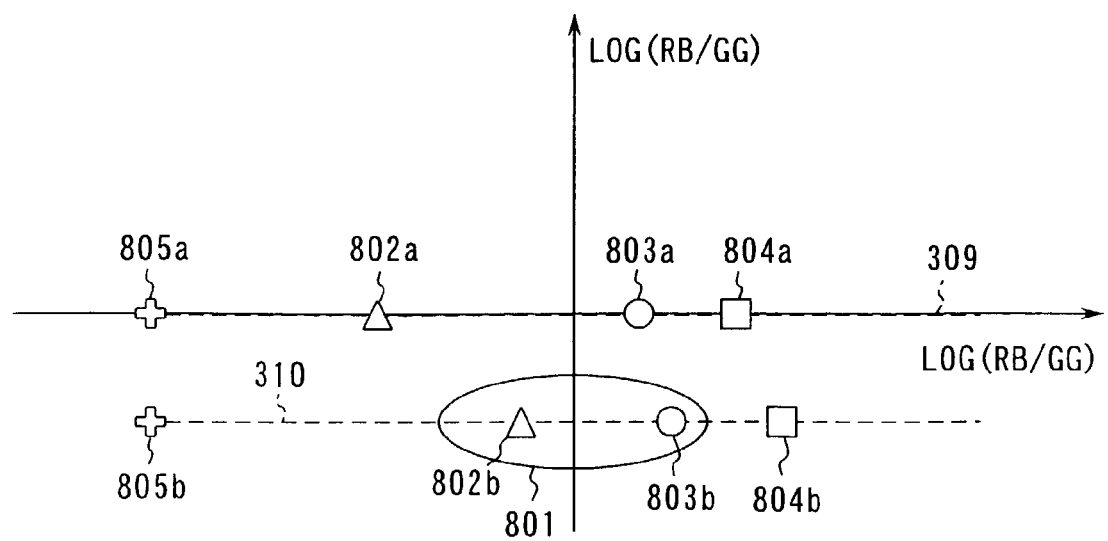
FIG. 15 is a graph for explaining a method of determining whether a white light source or fluorescent light source is used in estimating an illumination light color.

FIG. 15 is a view for explaining a method of determining the type of illumination light source. Dotted lines 309 and 310 correspond to the above horizontal lines 309 and 310 and indicate illumination light color estimation ranges for an incandescent light source and fluorescent lamp, respectively. An ellipse 801 indicates the color temperature range of a fluorescent lamp.

On the coordinate system of an estimated illumination light source color, when estimated color data 802a is obtained assuming an incandescent light source, estimated color data 802b is obtained assuming a fluorescent light source, and the illumination determination index (evaluation value 1) is positive and indicates a fluorescent lamp, the estimated color data 802b of illumination light falls within the ellipse 801. At this time, it is determined that the actual light source is a fluorescent lamp, and the estimated color data 802b of illumination light is used as an estimated value. On the coordinate system of an estimated illumination light source color, when estimated color data 803a is obtained assuming an incandescent light source, estimated color data 802b is obtained assuming a fluorescent light source, and the illumination determination index (evaluation value 1) is negative and indicates an incandescent light source, it is determined that the actual light source is an incandescent light source, and the color data 803b of illumination light is used as an estimated value.

On the coordinate system of an estimated illumination light source color, when estimated color data 804a is obtained assuming an incandescent light source, estimated color data 804b is obtained assuming a fluorescent light source, and the illumination determination index (evaluation value 1) is positive and indicates a fluorescent lamp, the color data 804b of illumination light when a fluorescent light source is assumed falls outside the ellipse 801. At this time, it is determined that the light source is an incandescent light source, and the color data 804b of illumination light is used as an estimated value. On the coordinate system of an estimated illumination light source color, when estimated color data 805a is obtained assuming an incandescent light source, estimated color data 805b is obtained assuming a fluorescent light source, and the illumination determination index is negative and indicates an incandescent light source, it is determined that the actual light source is an incandescent light source, and the color data 805b of illumination light is used as an estimated value.

That is, in the above embodiment, the average value of three primary color signals from the image sensing element is obtained while equalizing the signal levels of the three primary color signals with respect to illumination light having a predetermined color temperature. Next, reduction processing is executed to make the average value close to the value at the predetermined color temperature. This reduction processing is the same as that described with reference to FIG. 3.

In reduction processing, the first target value is set assuming in an incandescent light source, then first color coordinate value information (line 309) is obtained when assuming the current light source is the first illumination light. Also, in reduction processing, the second target value is set assuming in a fluorent light source, then second color coordinate value information (line 310) is obtained when assuming the current light source is the second illumination light color. The evaluation value 1 representing whether the illumination light source is close to the first or second illumination light source system is obtained from the three primary color signals. On the basis of the evaluation value 1, whether the current light source has the first or second illumination light color is determined.

The color of illumination light can be estimated from the color coordinate values of the light source determined here and the average values of the received three primary color signals. This processing is the same as that described with reference to FIG. 3.

In the above way, whether the light source is an incandescent light source or fluoresce light source can be determined, and illumination light color estimation for implementing a satisfactory white balance function can be made.

Control of gains of three primary color signals is executed in the following way. The coordinates of an estimated illumination light color are defined as (Kt,Km), and the white balance gains of the R amplifier 107 and B amplifier 108 at a color temperature of 4,500 K are defined as $Ar_0$ and $Ab_0$, respectively. As described above, gains Ar and Ab of the R amplifier 107 and B amplifier 108 are controlled by $$Ar=Ar_0 \cdot \text{EXP}((Kt-Km)/2) \quad (3)$$

$$Ab=Ab_0 \cdot \text{EXP}((-Kt-Km)/2) \quad (4)$$

Thus, R, G, and B signals having the same level are obtained with respect to a white object illuminated with a white light source within a predetermined color temperature range.

On the other hand, to maintain the atmosphere of illumination, the coordinate values of the illumination light color in the direction of color temperature are multiplied by a reduction ratio C to set the white balance gains given by $$Ar=Ar_0 \cdot \text{EXP}((C \cdot Kt-Km)/2) \quad (5)$$

$$Ab=Ab_0 \cdot \text{EXP}((-C \cdot Kt-Km)/2) \quad (6)$$

The reduction ratio C is set to a value between C=0.5 and C=1.0. That is, the reduction ratio C is preferably set to a value between C=0.5 at which white color appears on the screen as almost the same color as that of an object under illumination and C=1.0 at which white color appears on the screen as the same color as that of an actual object.

The signals whose levels are equalized in the above manner are subjected to gamma correction processing, edge correction processing, and conversion into a luminance/color difference signal by a camera process circuit 109, thereby implementing a solid-state image sensing apparatus having an automatic white balance function.

As described above, according to the illumination light color estimating method for white balance of the present invention, an image sensing apparatus which has a satisfactory white balance function and can execute illumination light color estimation that accurately determines whether a light source is an incandescent light source or fluorescent lamp by reducing a strong color component of three primary color signals from a color in an image while maintaining a color appearance to serve as a light source color can be implemented. Hence, a color in an image is prevented from inadvertently becoming light. In addition, the outdoor scene photographing mode is prevented from being erroneously recognized as a fluorescent lamp illumination mode. Hence, white balance does not shift at the time of outdoor scene photographing with a large amount of green component.

Figure 16:
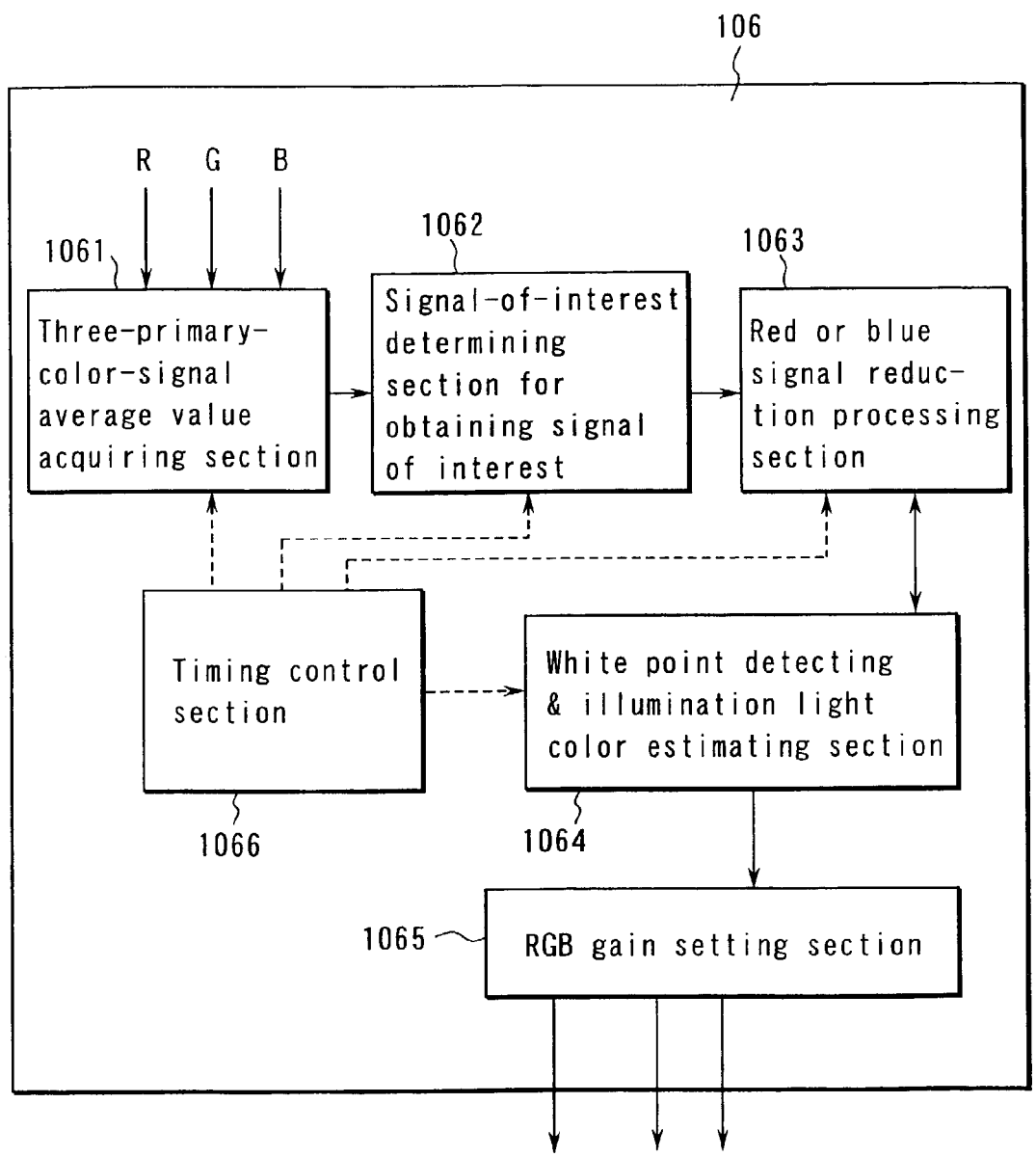
FIG. 16 is a block diagram simply showing main functions of the image sensing apparatus according to the present invention.

FIG. 16 simply shows a block for executing arithmetic processing of obtaining white balance adjustment in the above-described embodiments. This arithmetic processing block is constructed in the microcomputer 106. A three-primary-color-signal average value acquiring section 1061 acquires the average value of three primary color signals from the image sensing element, whose signal levels are equalized with respect to illumination light having a predetermined color temperature. The signal-of-interest determining section 1062 determines which of the red and blue signals contained in the average value has the higher level. When the red signal is multiplied by the blue signal, the resultant signal is divided by the green signal to obtain coordinate values, and when the green signal is larger than the resultant coordinate values, a red or blue signal reduction processing section 1063 reduces the red or blue signal in the signal of interest together with the green signal at the same ratio. When the green signal is smaller than the coordinate values, the red or blue signal reduction processing section 1063 reduces only the red or blue signal in the signal of interest. Next, a white point detecting & illumination light color estimating section 1064 obtains a white point at which the geometric average of the signal of interest obtained by reduction processing has the same level as that of the green signal and estimates a color corresponding to the white point as the color of illumination light. In accordance with this estimation, an RGB gain setting section 1065 sets the gains of the amplification sections 107 and 108. A timing control section 1066 sets the operation timing of each block.

Figure 17:
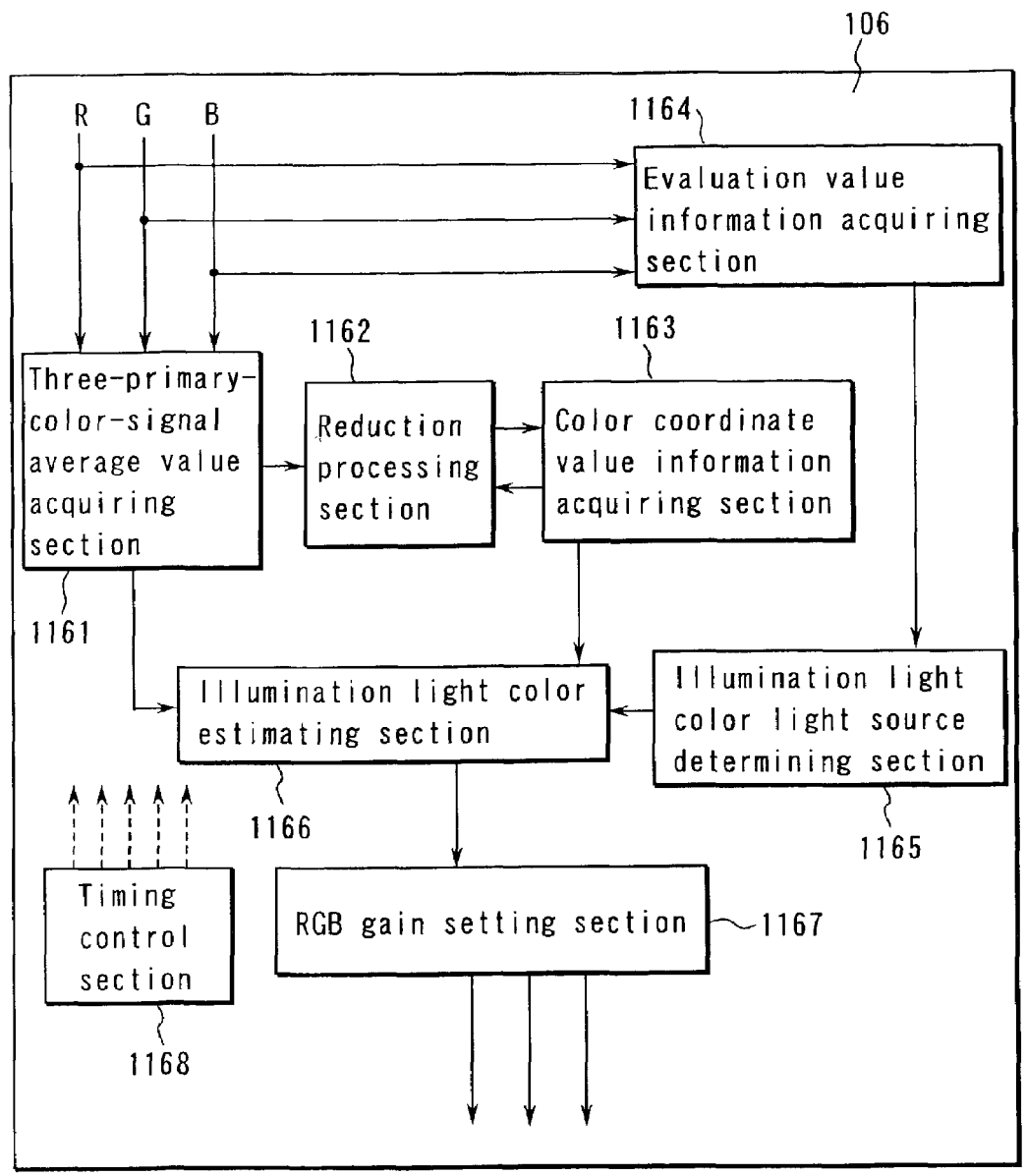
FIG. 17 is a block diagram simply showing main functions of the image sensing apparatus according to the present invention.

FIG. 17 simply shows another example of a block for executing arithmetic processing of obtaining white balance adjustment in the above-described embodiments. This arithmetic processing block is constructed in the microcomputer 106. A three-primary-color-signal average value acquiring section 1161 acquires the average value of three primary color signals from the image sensing element, whose signal levels are equalized with respect to illumination light having a predetermined color temperature. A reduction processing section 1162 executes reduction processing to make the average value close to the value of the predetermined color temperature. Next, a color coordinate value information acquiring section 1163 obtains the first color coordinate value information of the light source when the first target value in the reduction processing is set and the current light source is assumed to have the first illumination light color, and the second color coordinate value information of the light source when the second target value in the reduction processing is set and the current light source is assumed to have the second illumination light color. An evaluation value information acquiring section 1164 obtains, from the three primary color signals, evaluation value information representing whether the illumination light source is close to the first or second illumination light source system. An illumination light color light source determining section 1165 determines on the basis of the evaluation value information whether the current light source has the first or second illumination light color. An illumination light color estimating section 1166 estimates the color of illumination light from the determined light source color coordinate value information and the average value of the received three primary color signals. In accordance with this estimation, an RGB gain setting section 1167 sets the gains of the amplification sections 107 and 108. A timing control section 1168 sets the operation timing of each block.

Above embodiments include following concepts.

An image formed from the three primary color signals is segmented into a plurality of blocks, and average values are obtained respectively for the three primary color signals in each block; the signal with the higher level, of red and blue signals contained in the average values, is set as a signal of interest; the red or blue signal in the signal of interest is reduced together with the green signal at the same ratio when the first or second target value is larger than a value obtained by dividing a resultant value by the green signal, the resultant value being obtained by multiplying the red signal by the blue signal; the red or blue signal in the signal of interest is reduced when the first or second target value is smaller than value obtained by division; a white point at which coordinate values of the signal of interest obtained by the reduction processing has the same level as that of the first or second target value is obtained, and a color corresponding to a value of the white point is estimated as an illumination light color of each block; and weight information which is added to increase as the color temperature becomes closer to the predetermined color temperature under an environment of the first or second illumination light is averaged by multiplying the weight information by the values of coordinate points obtained in each block, and the averaged value is defined as the first or second color coordinate value information.

As other aspect, above embodiments includes, an image formed from the three primary color signals is segmented into a plurality of blocks, and average values are obtained respectively for the three primary color signals in each block; a first evaluation value representing by a sign whether a coordinate value obtained by dividing a resultant value by the green signal is close to the first or second target value is calculated, the resultant value being obtained by multiplying the red signal by the blue signal; a second evaluation value which decreases as the ratio of the red signal level to the blue signal level in the average value increases is calculated; a third evaluation value which increases as brightness based on the red, blue, and green signals in the average value increases is calculated; and an evaluation value representing that the illumination light color is close to the second illumination light source color is defined when a sum of products of the first to third evaluation values over the entire image has a sign which indicates the second illumination light source color system, and the ratio of the red signal level to the blue signal level of the estimated light source color obtained as the second illumination light source color system falls within a predetermined range, and otherwise, an evaluation value representing that the illumination light color is close to the first illumination light source color system is defined.

Additional advantages and modifications will occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of estimating an illumination light color using three primary color signals to obtain white balance, comprising:

acquiring average values of the three primary color signals from an image sensing element, the three primary colors having signal levels equalized with respect to illumination light having a predetermined color temperature in a predetermined image sensing area of the image sensing element;

setting the signal with the higher level, of red and blue signals contained in the average values, as a signal of interest;

reducing the red or blue signal in the signal of interest together with a green signal at the same ratio when the green signal is larger than a value obtained by dividing a resultant value by the green signal, and reducing the red or blue signal in the signal of interest when the green signal is smaller than the resultant value, the resultant value being obtained by multiplying the red signal by the blue signal; and obtaining a white point at which a geometric average of the red and blue signals obtained by the reduction processing has the same level as that of the green signal and estimating a color corresponding to the white point as the illumination light color.

2. A method according to claim 1, wherein clip processing is executed to make the estimated illumination light color fall within a predetermined range.

3. A method according to claim 1, wherein an image formed from the three primary color signals is segmented into a plurality of blocks, the signal of interest is defined from the three primary color signals in each block, the white point is obtained in each black, and an average value of coordinate points corresponding to the white points of each block is estimated as the illumination light color.

4. A method according to claim 2, wherein a weight used to obtain the average value is determined on the basis of brightness information of the three primary color signals.

5. A method according to claim 4, wherein the weight used to obtain the average value increases as a degree of color saturation represented by average color data of the block decreases.

6. An image sensing apparatus which estimates an illumination light color using three primary color signals to obtain white balance, comprising:

means for acquiring average values of the three primary color signals from an image sensing element, the three primary color signals having signal levels equalized with respect to illumination light having a predetermined color temperature in a predetermined image sensing area of the image sensing element;

means for setting the signal with the higher level, one of red and blue signals contained in the average value, as a signal of interest;

means for reducing the red or blue signal in the signal of interest together with a green signal at the same ratio when the green signal is larger than a value obtained by dividing a resultant value by the green signal, and for reducing the red or blue signal in the signal of interest when the green signal is smaller than the resultant value, the resultant value being obtained by multiplying the red signal by the blue signal; and means for obtaining a white point at which a geometric average of the signal of interest obtained by the reduction processing has the same level as that of the green signal and estimating a color corresponding to the white point as the illumination light color.

7. A method of estimating an illumination light color using three primary color signals to obtain white balance, comprising:

acquiring average values of the three primary color signals from an image sensing element, the three primary color signals having signal levels equalized with respect to illumination light having a predetermined color temperature in a predetermined image sensing area of the image sensing element;

executing reduction processing of one of the signal levels of the average values of the three primary color signals to make a value of a color temperature calculated from the average values close to the value of the predetermined color temperature;

obtaining first and second coordinate value information to stop the reduction processing when the current light source is to be a first and a second illumination light color;

obtaining, from the three primary color signals, evaluation value information representing whether the illumination light source is close to the first or second illumination light source;

determining on the basis of the evaluation value information whether the current light source has the first or second illumination light color; and estimating the illumination light color from the determined light source color coordinate value information and the received average values of the three primary color signals.

8. An image sensing apparatus which estimates an illumination light color using three primary color signals to obtain white balance, comprising:

means for acquiring average values of the three primary color signals from an image sensing element, the three primary color signals having signal levels equalized with respect to illumination light having a predetermined color temperature in a predetermined image sensing area of the image sensing element;

means for executing reduction processing of one of the signal levels of the average values of the three primary color signals to make a value of a color temperature calculated from the average values close to the value of the predetermined color temperature;

means for obtaining first and second color coordinate value information to stop the reduction processing when the current light source is to be a first and a second illumination light color;

means for obtaining, from the three primary color signals, evaluation value information representing whether the current light source is close to the first or second illumination light source;

means for determining on the basis of the evaluation value information whether the current light source has the first or second illumination light color; and means for estimating the illumination light color from color coordinate value information of the determined illumination light color and the received average values of the three primary color signals.

* * * * *